(12) United States Patent
Liu

(10) Patent No.: US 11,201,636 B2
(45) Date of Patent: Dec. 14, 2021

(54) CRADLE APPARATUS FOR USE WITH A MOBILE COMMUNICATIONS DEVICE

(71) Applicant: World Richman Manufacturing Corporation, Elgin, IL (US)

(72) Inventor: Michael Liu, FoShan (CN)

(73) Assignee: World Richman Manufacturing Corporation, Elgin, IL (US)

( * ) Notice: Subject to any disclaimer, the term of this patent is extended or adjusted under 35 U.S.C. 154(b) by 56 days.

(21) Appl. No.: 16/844,444

(22) Filed: Apr. 9, 2020

(65) Prior Publication Data

US 2020/0328773 A1 Oct. 15, 2020

Related U.S. Application Data

(60) Provisional application No. 62/831,321, filed on Apr. 9, 2019.

(51) Int. Cl.
*H04B 1/3888* (2015.01)
*H04M 1/21* (2006.01)
*H04M 1/02* (2006.01)

(52) U.S. Cl.
CPC .......... *H04B 1/3888* (2013.01); *H04M 1/026* (2013.01); *H04M 1/21* (2013.01)

(58) Field of Classification Search
CPC ...... H04B 1/3888; H04M 1/21; H04M 1/026; H04M 1/04
See application file for complete search history.

(56) References Cited

U.S. PATENT DOCUMENTS

| | | | |
|---|---|---|---|
| 8,655,422 B2 * | 2/2014 | Stiehl | A45F 5/00 455/575.8 |
| 9,048,665 B2 * | 6/2015 | Wojcik | H02J 4/00 |
| 9,392,854 B2 * | 7/2016 | Fathollahi | H05K 5/02 |
| 9,651,985 B2 * | 5/2017 | Shih | G02B 27/022 |
| 9,705,183 B2 * | 7/2017 | Nikitin | H01Q 3/24 |
| 9,722,652 B2 * | 8/2017 | Sakuma | G06F 3/041 |
| 9,838,060 B2 * | 12/2017 | McGaughey | H04M 1/0202 |
| 10,002,592 B2 * | 6/2018 | Cho | G09G 5/373 |
| 10,667,589 B2 * | 6/2020 | Fathollahi | A45C 13/02 |
| 2012/0129580 A1 * | 5/2012 | Tam | G01S 7/4813 455/575.1 |

(Continued)

*Primary Examiner* — Lewis G West
(74) *Attorney, Agent, or Firm* — Christopher J. Scott

(57) ABSTRACT

A cradle apparatus cradles a mobile communications device, detects spatial distances from target objects positioned in adjacency to the cradle apparatus, and communicates with the mobile communications device for selectively powering off or powering on the visual display of the mobile communications device based on its distance from a target object. The cradle apparatus includes a cradle assembly, at least one distance sensor, and sensor support circuitry. The cradle assembly is configured for receiving and cradling the communications device and displaying a visual display of the communications device as cradled by the cradle assembly. Each distance sensor is positioned by the cradle assembly for detecting the relative distance of select objects positioned in adjacency to the visual display. The sensor support circuitry communicates each distance sensor to a switch or circuit board for powering off or powering on the visual display depending on its distance from the target object.

18 Claims, 6 Drawing Sheets

(56) References Cited

U.S. PATENT DOCUMENTS

| | | | | |
|---|---|---|---|---|
| 2013/0109435 | A1* | 5/2013 | McCaughey et al. | H01Q 1/40 455/556.1 |
| 2014/0152890 | A1* | 6/2014 | Rayner | H04N 5/2252 348/376 |
| 2014/0192481 | A1* | 7/2014 | Wojcik | G06F 21/86 361/679.55 |
| 2016/0191097 | A1* | 6/2016 | Huh | H04M 1/0268 455/575.1 |
| 2016/0205237 | A1* | 7/2016 | Baek | H04M 1/0245 455/575.8 |
| 2016/0259462 | A1* | 9/2016 | Liao | H04M 15/93 |
| 2016/0315652 | A1* | 10/2016 | Tabatabai | H04M 1/72409 |

\* cited by examiner

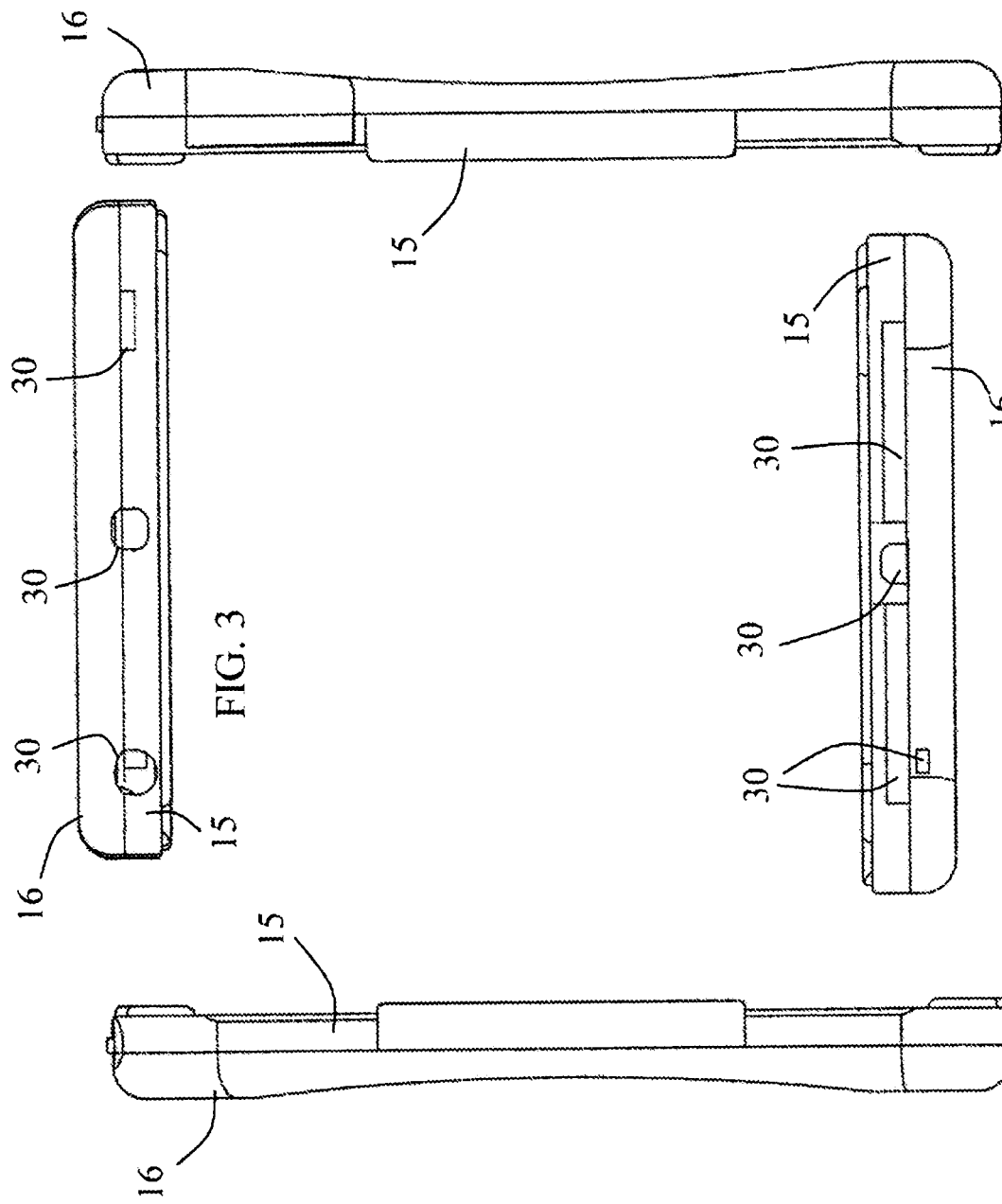

CRADLE APPARATUS FOR USE WITH A MOBILE COMMUNICATIONS DEVICE

PRIOR HISTORY

This application claims the benefit of pending US Provisional Patent Application No. 62/831,321 filed in the United States Patent and Trademark Office (USPTO) on 9 Apr. 2019, the specifications and drawings of which are hereby incorporated by reference thereto.

BACKGROUND OF THE INVENTION

Field of the Invention

The present invention relates generally to a cradle or cover apparatus for use with a mobile or electronic communications device. The present invention more particularly relates to a cradle or cover apparatus operable to encase or cover a mobile or electronic communications device exemplified by a tablet computer for detecting spatial distancing from a user's face and communicating with the communications device for automatically powering off and powering on the communications device depending on spatial distance from the user's face so as to prevent the visual display of the electronic communications device from harming the user's vision.

SUMMARY OF THE INVENTION

Among the many objectives of the invention is the provision of a tablet cover or cradle appartus that operates to cover or cradle and protect a mobile communications device exemplified by a tablet type computer so as to primarily shield the communications device from damage. Users of such devices are often children who often use such devices for educational purposes. It is noted that children are prone to place or position the visual displays of such devices at a position that is considered by some to be too close to the user's face or eyes, potentially causing harm to the user's vision.

Thus there is a perceived need in the art for a mechanim to safeguard the user from any damage that might occur to the user's eyes or vision by automatically turning off the visual displays of such communications devices when placed within a certain proximity or critical distance relative to the user's face or eyes, and to automatically turn on the visual displays of such communications devices when displaced or repositioned to a position that is outside a certain proximity or critical distance relative to the user's face or eyes.

In certain embodiments, the basic invention may be said to essentially teach or disclose a cradle apparatus for (a) cradling a mobile communications device, (b) detecting spatial distances from objects positioned in adjacency to the mobile communications device as cradled by the cradle apparatus, and (c) and communicating with the mobile communications device for selectively powering off or powering on the visual display of the mobile communications device depending on its distance from a target object exemplified by a user's face or eyes.

The cradle apparatus according to the present invention essentially comprises a cradle assembly, at least one distance sensor, and sensor support circuitry for powering off or powering on the cradled device with visual display based on proximity of the at least one distance sensor relative to a target object. The cradle assembly is esesntially configured for receiving or cradling the mobile communications device and displaying the visual display of the mobile communications device as cradled. The at least one distance sensor is positioned in cooperative association with the cradle assembly for detecting the relative distance of select or target objects positioned in adjacency to the visual display of the mobile communications device as received or cradled by the cradle assembly.

The sensor support circuitry preferably communicates the at least one distance sensor with a circuit or switch for powering off or powering on circuit components housed by the cradle assembly for further powering off the visual display when the cradle assembly is positioned within a select distance from a select object exemplified by a user's face and powering on the visual display when the cradle assembly is positioned outside the select distance from the select object exemplified by a user's face.

Each distance sensor is preferably positioned so as to be substantially coplanar with an anterior surface of the visual display of the mobile communication device as received or cradled by the cradle assembly for enhancing the accuracy of the object-to-device distance measurement. In this regard, it is contemplated that the preferred select distance is a distance value of 10 to 12 inches, which select distance may be adjusted according to the user's needs or preferences.

The cradle assembly preferably comprises an anterior visual display frame portion and a posterior device support portion. The at least one distance sensor may be preferably and posteriorly positioned adjacent at least one sensor aperture formed in the anterior visual display frame portion for detecting the distance of objects anteriorly located relative to the anterior visual display frame portion via the at least one sensor aperture.

In a preferred embodiment, the cradle apparatus according to the present invention comprises at least two distance sensors for enhancing the accuracy of object-to-device distance measurement. A first distance sensor of the at least two distance sensors is preferably positioned adjacent a first sensor aperture formed in a first visual display frame portion of the anterior visual display frame portion and a second distance sensor of the at least two distance sensors is preferably positioned adjacent a second sensor aperture formed in a second visual display frame portion of the anterior visual display frame portion.

The first visual display frame portion may preferably be defined by a select longitudinal end frame portion and the second visual display frame portion may preferably be defined by a select lateral side frame portion extending orthogonally relative to the select longitudinal end frame portion. The at least two distance sensors are thus preferably positioned at longitudinal and latitudinal positions relative the visual display for further enhancing the accuracy of object-to-device distance measurement.

The cradle apparatus according to the present invention may be said to alternatively and basically operate to cradle a visual display, detect spatial distances from objects positioned in adjacency to a cradled visual display, and selectively power on and off the cradled visual display depending on the spatial distancing between the cradled visual display and the target object. The cradle apparatus may thus be said to esentially comprise a cradle assembly, at least one sensor, and certain sensor support circuitry. The cradle assembly is essentially configured for receiving or cradling and simultaneously displaying the visual display.

Each distance sensor is preferably positioned in cooperative association with the cradle assembly for detecting the relative distance of select objects positioned in adjacency to the cradled visual display. The sensor support circuitry communicates each distance sensor with a circuit or switch for powering off the cradled visual display when the cradle assembly is positioned within a select distance from a select object and powering on the cradled visual display when the cradle assembly is positioned outside the select distance from the select object.

BRIEF DESCRIPTIONS OF THE DRAWINGS

Other features and objectives of the invention will become more evident from a consideration of the following brief descriptions of patent drawings.

FIG. 2 is a first lateral edge view of the cradle apparatus according to the present invention.

FIG. 3 is a top edge view of the cradle apparatus according to the present invention.

FIG. 4 is a bottom edge view of the cradle apparatus according to the present invention.

FIG. 5 is a second lateral edge view of the cradle apparatus according to the present invention.

DETAILED DESCRIPTION OF THE PREFERRED EMBODIMENT

Figure 1:
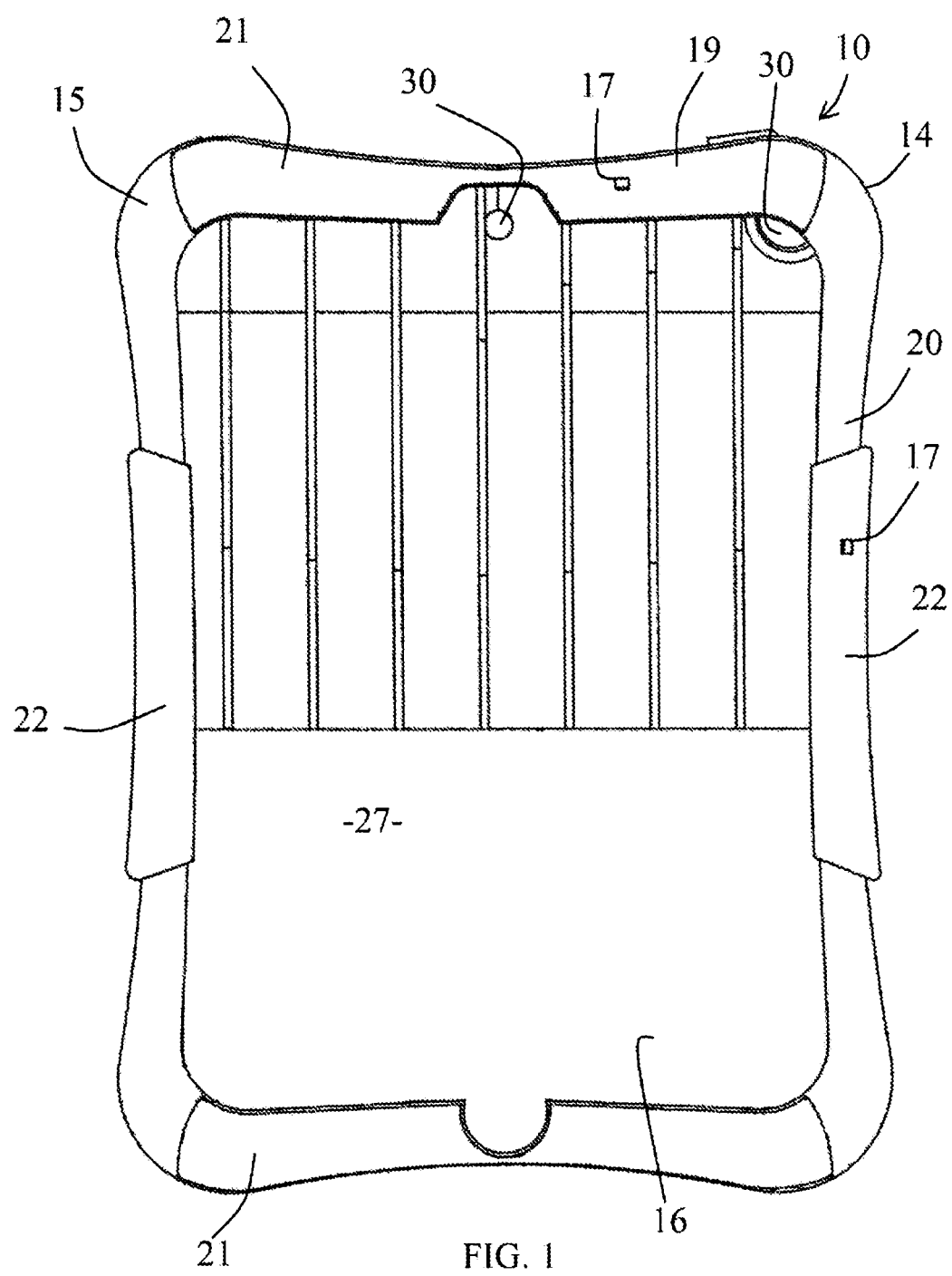
FIG. 1 is an anterior plan view of the cradle apparatus according to the present invention.

Referring now to the drawings with more specificity, the present invention preferably provides a cradle apparatus as depicted and referenced at 10. The cradle apparatus 10 according to the present invention basically cradles and protects a mobile or electronic communications device as depicted and referenced at 11 when outfitted thereupon. For purposes of illustrative and descriptive ease, the mobile or electronic communications device 11 usable in combination with the cradle apparatus 10 according to the present invention may by typified or exemplified by a tablet computer apparatus having a visual display as at 12. The present invention contemplates further applicability to other similar mobile or electronic communications devices having visual displays, such as smart phones, laptops, and relatively less mobile visual displays such as desktop monitors and the like.

As prefaced above, the cradle apparatus 10 according to the present invention further operates to detect spatial distance of the cradle apparatus 10 with cradled device or cradled visual display from objects positioned in adjacency to the cradle apparatus 10. The spatial distance from the cradle apparatus 10 to the target object (e.g. a user's face) may then be detected and an object-to-device distance measurement operates to power on or power off the visual display 12 of the mobile communications device 11 as cradled or received by the cradle apparatus 10.

In this regard, the primary application contemplated by the cradle apparatus 10 is to prevent any harmful effects that may otherwise occur when a visual display 12 is placed too close to a user's face or eyes. The object-to-device distance measurement is the basis for powering off or powering on circuit components housed within the cradle apparatus 10 for further powering off or powering onthe visual display 12 depending on the relative position of the cradle apparatus 10 and cradled visual display 12 relative to the user's face 13 as generally and comparatively depicted in FIGS. 6-8.

Figure 6:
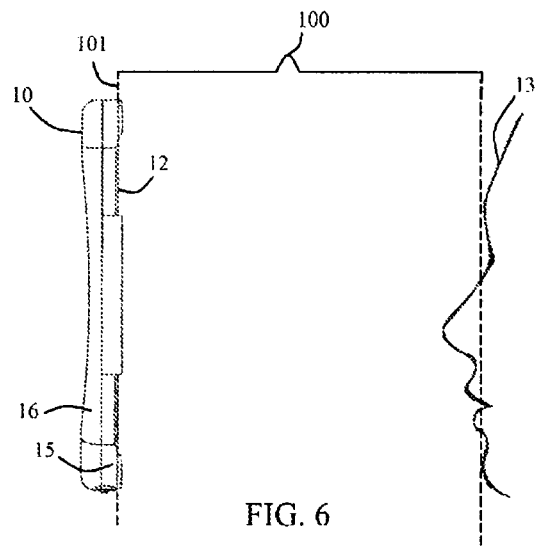
FIG. 6 is a first sequential diagrammatic depiction showing the cradle apparatus according to the present invention positioned a critical distance from a user's face.
Figure 7:
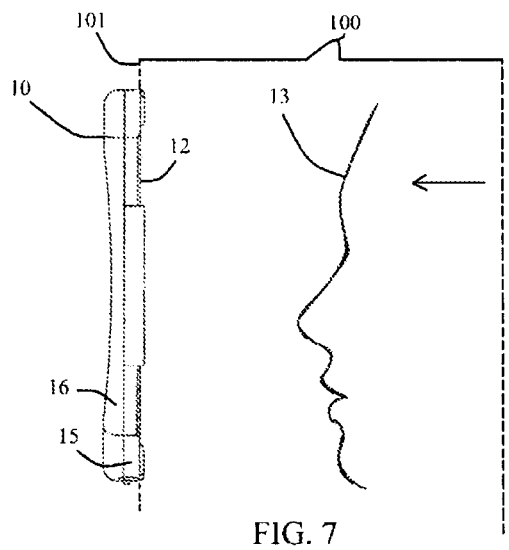
FIG. 7 is a second sequential diagrammatic depiction showing the cradle apparatus according to the present invention positioned within the critical distance from the user's face in which position the visual display of the communications device cradled by the cradle apparatus is in a powered-off state for safeguarding the user's vision.
Figure 8:
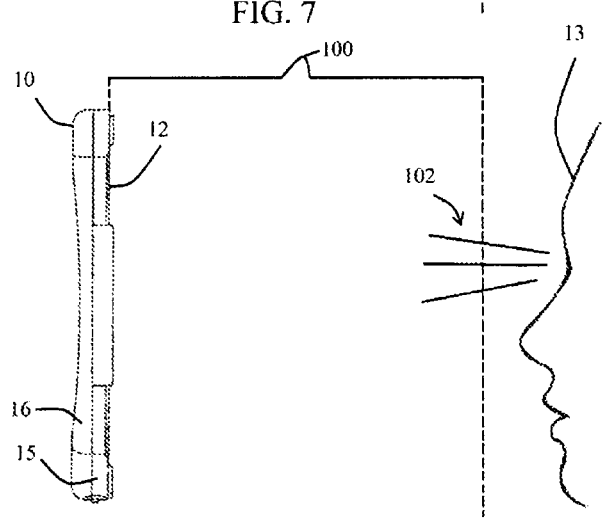
FIG. 8 is a third sequential diagrammatic depiction showing the cradle apparatus according to the present invention positioned outside the critical distance from the user's face in which position the visual display of the communications device cradled by the cradle apparatus is in a powered-on state for enabling the user to view the visual display.

Referencing FIG. 6, the reader will there consider a critical distance 100 from the cradle apparatus 10 relative to the user's face 13. When the user's face 13 is moved or positioned within the critical or select distance 100 relative to plane 101 of the visual display 12 as cradld by the cradle apparatus 10, the visual display 12 of the mobile communications device 11 is powered off for disenabling the user to view content upon the visual display 12 as generally depicted in FIG. 7. When the user's face 13 is moved outside the critical or select distance 100 relative to the plane 101 of the visual display 12 as cradled by the cradle apparatus 10, the visual display 12 of the mobile communications device 11 is powered on for enabling the user to view content (as at 102) displayed thereupon. While it is contemplated that the preferred critical distance be on the order of 10-12 inches, it is further contemplated that the critical distance 100 may be adjusted according to the needs or preferences of the user.

The cradle apparatus 10 according to the present invention preferably comprises a cradle housing or assembly 14 and sensor support circuitry housed within the cradle housing or assembly 14 for providing the above-noted functionality. The cradle assembly 14 is preferably configured for receiving and cradling the mobile communications device 11 and for readily displaying the visual display 12 of the mobile communications device 11. The cradle assembly 14 preferably comprises an an anterior visual display frame portion as at 15 and a posterior device-support portion as at 16. The anterior visual display frame portion 15 preferably comprises at least one, but preferably two sensor apertures as at 17 for allowing distance sensor(s) 18 positioned in posterior adjacency to the sensor apertures 17 to detect object-to-device distance(s). In other words, at least one distance sensor 18 is preferably posteriorly positioned adjacent at least one sensor aperture 17 formed in the anterior visual display frame portion 15 for detecting distance of objects anteriorly located relative to the anterior visual display frame portion 15 via the sensor aperture(s) or slots 17.

It will be understood from a consideration of the illustrative support material submitted in support of these specifications that the cradle apparatus 10 according to the present invention preferably comprises at least two distance sensors 18 within the operating circuitry. A first distance sensor 18 of the at least two distance sensors 18 is preferably positioned adjacent a first sensor aperture 17 formed in a first visual display frame portion 19 of the anterior visual display frame portion 15 and a second distance sensor 18 of the at least two distance sensors 18 is preferably positioned adjacent a second sensor aperture 17 formed in a second visual display frame portion 20 of the anterior visual display frame portion 15. Highly accurate object-to-device distance measurement data may thereby be collected via triangulation principles in view of the fixed distance between the spaced sensors 18 that are preferably positioned so as to be substantially coplanar with the anterior surface of the visual display 12 as at plane 101.

Referencing FIG. 1, the reader will there consider that the first visual display frame portion 19 may preferably be defined by a select longitudinal end frame portion of the two opposite, upper and lower longitudinal ends 21 of the cradle assembly 14. Further, the second visual display frame portion 20 may preferably be defined by a select lateral side frame portion of the two laterally opposed lateral side frame portions 22. The lateral side frame portions 22 generally extend orthogonally relative to the longitudinal end frame portions 21 such that the at least two distance sensors 18 are preferably positioned at longitudinal and latitudinal positions relative the visual display 12 for enhancing the accuracy of object-to-device distance measurement data obtained from the distance sensors 18 for selectively powering off or powering on the visual display 12 of the mobile communications device 11.

Figure 9:
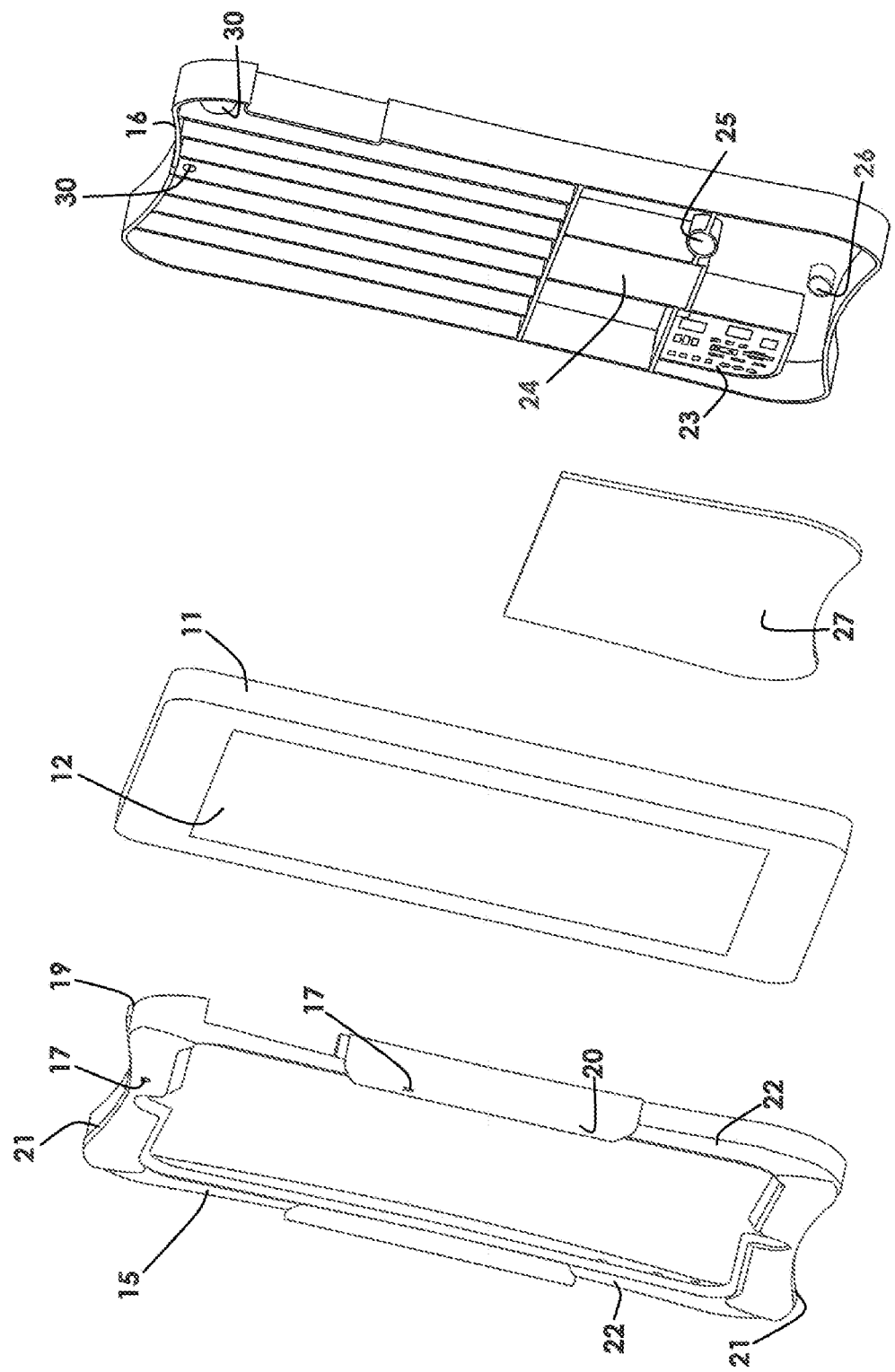
FIG. 9 is an anterior exploded perspective view showing from left to right an anterior visual display frame portion, a communications device, a circuit compartment cover panel, and a posterior device support portion housing circuit components.
Figure 10:
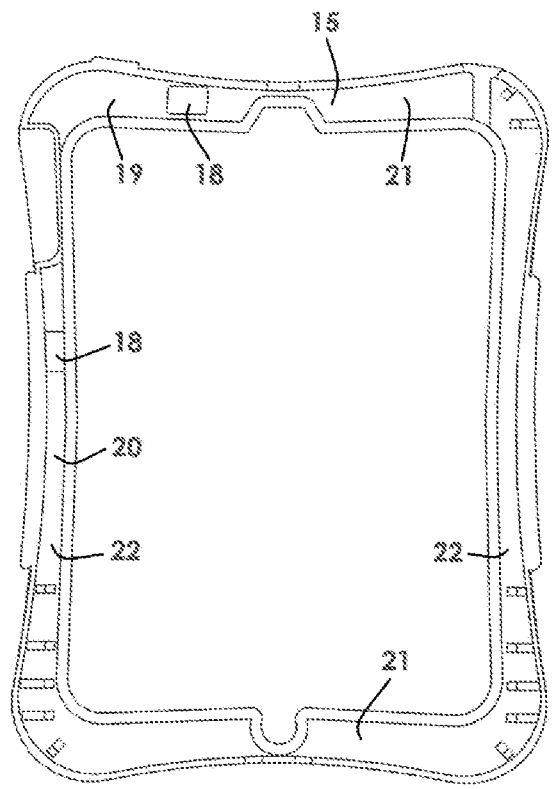
FIG. 10 is a posterior plan view of the anterior visual display frame portion showing two distance sensors mounted thereon.
Figure 10A:
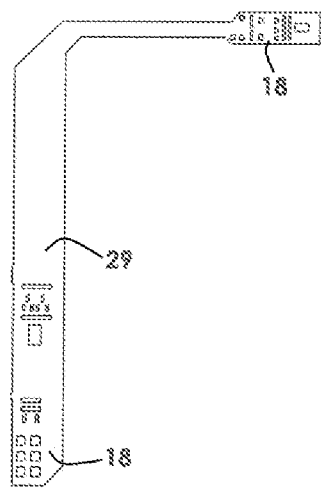
FIG. 10A is a plan view of a sensor strip showing two distance sensors at the opposite ends of the sensor strip.

Referencing FIG. 10, the reader will there consider the two spaced distance sensors 18 respectively positioned at the first visual display frame portion 19 as preferably defined by a select longitudinal end frame portion of the two opposite, upper and lower longitudinal ends 21 and at the second visual display frame portion 20 as preferably defined by a select lateral side frame portion of the two laterally opposed lateral side frame portions 22. Comparatively referencing FIGS. 9 and 10 the reader will further consider the sensor apertures 17 visibly located at the anterior side of the anterior visual display frame portion 15 as depicted in FIG. 9. The distance sensors 18 are positioned in posterior adjacency to these slots or apertures 17 as comparatively depicted in FIG. 10.

Figure 11:
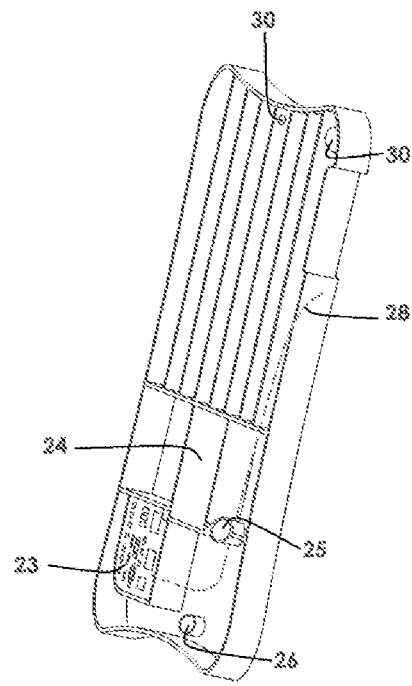
FIG. 11 is an anterior perspective view of the posterior device support portion depicting placement of apparatus circuit components.
Figure 12:
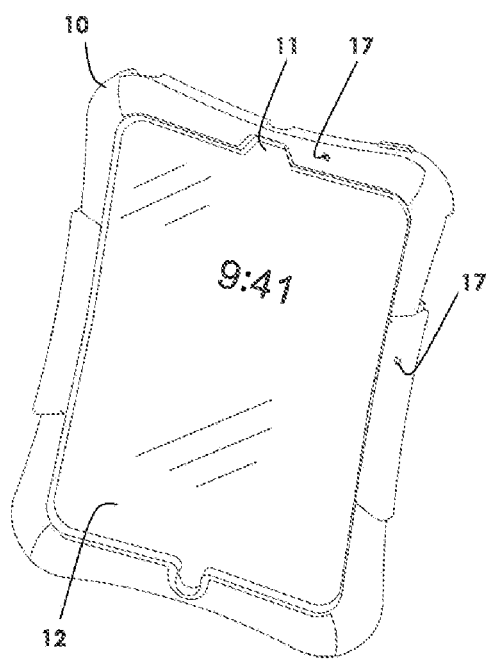
FIG. 12 is an anterior perspective view of the cradle apparatus according to the present invention holding or cradling a mobile communications device with the visual display in a powered-on state.

Further referencing FIG. 9, the reader will there consider circuit components housed within or at the posterior device-support portion 16, including a main circuit board as at 23, a battery as at 24, an electromagnet as at 25, and a permanent magnet as at 26. These components are preferably covered by a circuit compartment cover as at 27. FIG. 11 further depicts a sensor strip communication pathway as at 28 leading from the sensor strip 29 (outfitted with distance sensors 28 located at the ends thereof) to the main circuit board 23. It is contemplated that electromagnetizing the electromagnet 25 provides a simple and effective means to selectively and controllably power off and power on the visual display 12. In this regard, it is contemplated that magnet placement within the cradle assembly 14 may be device-specific for enabling the functionality.

The cradle assembly 14 may further preferably comprise a series of device-cooperative apertures, slots or formations as at 30. In this regard, it is well known in the art that communications devices provide certain peripheral input and output features so that users thereof may more effectively operate the devices. The device-cooperative apertures, slots or formations 30 are formed in the material construction of the cradle assembly 14 for enabling the user to utilize the device features via the cradle assembly 14. The device-cooperative apertures, slots or formations 30 may include charging apertures, speaker apertures, microphone apertures, headphone jack apertures, volume button apertures, power button apertures, and camera apertures.

While the above descriptions contain much specificity, this specificity should not be construed as limitations on the scope of the invention, but rather as an exemplification of the invention. In certain embodiments, the basic invention may be said to essentially teach or disclose a cradle apparatus for (a) cradling a mobile communications device, (b) detecting spatial distances from objects positioned in adjacency to the mobile communications device as cradled by the cradle apparatus, and (c) and communicating with the mobile communications device for selectively powering off or powering on the visual display of the mobile communications device.

The cradle apparatus essentially comprises a cradle assembly, at least one distance sensor, and sensor support circuitry for powering off or powering on the visual display based on proximity of the at least one distance sensor relative to a target object. The cradle assembly is essentially configured for receiving the mobile communications device and displaying the visual display of the mobile communications device. The at least one distance sensor is positioned in cooperative association with the cradle assembly for detecting the relative distance of select or target objects positioned in adjacency to the visual display of the mobile communications device as received or cradled by the cradle assembly.

The sensor support circuitry preferably and essentially communicates the at least one distance sensor with a circuit or switch for powering off or powering on circuit components housed by the cradle assembly for further powering off the visual display when the cradle assembly is positioned within a select distance from a select object exemplified by a user's face and powering on the visual display when the cradle assembly is positioned outside the select distance from the select object exemplified by a user's face.

Each distance sensor is preferably positioned so as to be substantially coplanar with an anterior surface of the visual display of the mobile communication device as received or cradled by the cradle assembly for enhancing the accuracy of the object-to-device distance measurement. In this regard, it is contemplated that the preferred select distance is a distance value of 10 to 12 inches, which select distance may be adjusted according to the user's needs or preferences.

The cradle assembly preferably comprises an anterior visual display frame portion and a posterior device support portion. The at least one distance sensor is preferably posteriorly positioned adjacent at least one sensor aperture formed in the anterior visual display frame portion for detecting the distance of objects anteriorly located relative to the anterior visual display frame portion via the at least one sensor aperture.

In a preferred embodiment, the cradle apparatus according to the present invention comprises at least two distance sensors for enhancing the accuracy of object-to-device distance measurement. A first distance sensor of the at least two distance sensors is preferably positioned adjacent a first sensor aperture formed in a first visual display frame portion of the anterior visual display frame portion and a second distance sensor of the at least two distance sensors is preferably positioned adjacent a second sensor aperture formed in a second visual display frame portion of the anterior visual display frame portion.

The first visual display frame portion may preferably be defined by a select longitudinal end frame portion and the second visual display frame portion may preferably be defined by a select lateral side frame portion extending orthogonally relative to the select longitudinal end frame portion. The at least two distance sensors are thus preferably positioned at longitudinal and latitudinal positions relative the visual display for further enhancing the accuracy of object-to-device distance measurement.

Summarized in a different manner, the cradle apparatus according to the present invention may basically operate to (a) cradle a visual display, (b) detect spatial distances from objects positioned in adjacency to a cradled visual display, and (c) selectively power off and on the cradled visual display depending on its spatial distance from a target or select object. The cradle apparatus may thus be said to essentially comprise a cradle assembly, at least one sensor, and certain sensor support circuitry. The cradle assembly is essentially configured for receiving or cradling and simultaneously displaying the cradled visual display.

Each distance sensor is preferably positioned in cooperative association with the cradle assembly for detecting the relative distance of select objects positioned in adjacency to the cradled visual display. The sensor support circuitry communicates each distance sensor with a circuit or switch for powering off the cradled visual display when the cradle assembly is positioned within a select distance from a select object and powering on the cradled visual display when the cradle assembly is positioned outside the select distance from the select object.

Although the cradle apparatus according to the present invention has been described by reference to a number of different embodiments, aspects, and features, it is not intended that the novel apparatus be limited thereby, but that modifications thereof are intended to be included as falling within the broad scope and spirit of the foregoing disclosure, the appended drawings, and the following claims.

What is claimed is:

1. A cradle apparatus for cradling a mobile communications device, detecting spatial distances from objects positioned in adjacency to the cradle apparatus, and communicating with the mobile communications device, the cradle apparatus comprising:
    a cradle assembly, the cradle assembly being configured for cradling the mobile communications device and displaying a visual display of the mobile communications device as cradled by the cradle assembly;
    at least one distance sensor, the at least one distance sensor being positioned in cooperative association with the cradle assembly for detecting the relative distance of select objects positioned in adjacency to the visual display of the mobile communications device as cradled by the cradle assembly; and
    circuitry for communicating the at least one distance sensor with a circuit for powering off or powering on circuit components housed by the cradle assembly for further powering off the visual display when the cradle assembly is positioned within a select distance from a select object and powering on the visual display when the cradle assembly is positioned outside the select distance from the select object.

2. The cradle apparatus of claim 1 wherein the at least one distance sensor is positioned so as to be substantially coplanar with an anterior surface of the visual display of the mobile communication device as cradled by the cradle assembly for enhancing the accuracy of the object-to-device distance measurement.

3. The cradle apparatus of claim 2 wherein the select distance is a distance value of 10 to 12 inches.

4. The cradle apparatus of claim 1 wherein the at least one distance sensor is operable to detect distance from a user's face as spatially positioned relative to the cradle assembly.

5. The cradle apparatus of claim 4 wherein the at least one distance sensor is operable to detect distance from a user's face as spatially positioned in anterior adjacency relative to the cradle assembly.

6. The cradle apparatus of claim 5 wherein the cradle assembly comprises an anterior visual display frame portion and a posterior device support portion, the at least one distance sensor being posteriorly positioned adjacent at least one sensor aperture formed in the anterior visual display frame portion for detecting the distance of objects anteriorly located relative to the anterior visual display frame portion.

7. The cradle apparatus of claim 6 comprising at least two distance sensors, a first distance sensor of the at least two distance sensors being positioned adjacent a first sensor aperture formed in a first visual display frame portion of the anterior visual display frame portion and a second distance sensor of the at least two distance sensors being positioned adjacent a second sensor aperture formed in a second visual display frame portion of the anterior visual display frame portion, the at least two distance sensors for enhancing the accuracy of object-to-device distance measurement.

8. The cradle apparatus of claim 7 wherein the first visual display frame portion is a select longitudinal end frame portion and the second visual display frame portion is a select lateral side frame portion extending orthogonally relative to the select longitudinal end frame portion, the at least two distance sensors thus being positioned at longitudinal and latitudinal positions relative the visual display for enhancing the accuracy of object-to-device distance measurement.

9. The cradle apparatus of claim 8 wherein the cradle assembly comprises a series of device-cooperative apertures, the device-cooperative apertures for enabling functionality of peripheral device features of the mobile communications device as received by the cradle assembly.

10. A cradle apparatus for cradling a visual display, detecting spatial distances from objects positioned in adjacency to a cradled visual display; and selectively powering off and on the cradled visual display, the cradle apparatus comprising:
    a cradle assembly, the cradle assembly being configured for cradling and displaying the visual display;
    at least one distance sensor, the at least one distance sensor being positioned by the cradle assembly for detecting the relative distance of select objects positioned in adjacency to the cradled visual display; and
    circuitry for communicating the at least one distance sensor to a circuit for selectively powering off the cradled visual display when the cradled visual display is positioned within a select distance from a select object and powering on the cradled visual display when the cradled visual display is positioned outside the select distance from the select object.

11. The cradle apparatus of claim 10 wherein the at least one distance sensor is positioned so as to be substantially coplanar with an anterior surface of the cradled visual display for enhancing the accuracy of the object-to-device distance measurement.

12. The cradle apparatus of claim 11 wherein the at least one distance sensor is operable to detect distance from a user's face as spatially positioned relative to the cradled visual display.

13. The cradle apparatus of claim 12 wherein the at least one distance sensor is operable to detect distance from a user's face as spatially positioned in anterior adjacency relative to the cradled visual display.

14. The cradle apparatus of claim 13 wherein the cradle assembly comprises an anterior visual display frame portion and a posterior device support portion, the at least one distance sensor being posteriorly positioned adjacent at least one sensor aperture formed in the anterior visual display frame portion for detecting distance of objects anteriorly located relative to the anterior visual display frame portion.

15. The cradle apparatus of claim 14 comprising at least two distance sensors, a first distance sensor of the at least two distance sensors being positioned adjacent a first sensor aperture formed in a first visual display frame portion of the anterior visual display frame portion and a second distance sensor of the at least two distance sensors being positioned adjacent a second sensor aperture formed in a second visual display frame portion of the anterior visual display frame portion, the at least two distance sensors for enhancing the accuracy of object-to-device distance measurement.

16. The cradle apparatus of claim 15 wherein the first visual display frame portion is a select longitudinal end frame portion and the second visual display frame portion is a select lateral side frame portion extending orthogonally relative to the select longitudinal end frame portion, the at least two distance sensors thus being positioned at longitudinal and latitudinal positions relative the cradled visual display for enhancing the accuracy of object-to-device distance measurement.

17. The cradle apparatus of claim 16 wherein the cradle assembly comprises a series of device-cooperative apertures, the device-cooperative apertures for enabling functionality of peripheral device features of the mobile communications device as cradled by the cradle assembly.

18. The cradle apparatus of claim 16 wherein the select distance is a distance value of 10 to 12 inches.

* * * * *